(12) United States Patent
Dielmann et al.

(10) Patent No.: US 9,990,919 B2
(45) Date of Patent: Jun. 5, 2018

(54) METHODS AND APPARATUS FOR JOINT STOCHASTIC AND DETERMINISTIC DICTATION FORMATTING

(71) Applicant: NUANCE COMMUNICATIONS, INC., Burlington, MA (US)

(72) Inventors: Alfred Dielmann, Aachen (DE); Olivier Divay, Vieux-Vy sur Couesnon (FR); Maximilian Bisani, Limbourg (BE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days. days.

(21) Appl. No.: 15/318,158

(22) PCT Filed: Jun. 24, 2014

(86) PCT No.: PCT/US2014/043798
§ 371 (c)(1),
(2) Date: Dec. 12, 2016

(87) PCT Pub. No.: WO2015/199653
PCT Pub. Date: Dec. 30, 2015

(65) Prior Publication Data
US 2017/0125015 A1   May 4, 2017

(51) Int. Cl.
*G06F 17/21* (2006.01)
*G10L 15/26* (2006.01)
(Continued)

(52) U.S. Cl.
CPC ........ *G10L 15/1822* (2013.01); *G06F 17/211* (2013.01); *G10L 15/02* (2013.01);
(Continued)

(58) Field of Classification Search
CPC ............... G06F 17/211; G06F 17/2715; G10L 15/1822; G10L 15/19
See application file for complete search history.

(56) References Cited

U.S. PATENT DOCUMENTS

| 5,956,683 | A |   | 9/1999 | Jacobs et al. |
| 6,052,657 | A | * | 4/2000 | Yamron ............ G06F 17/30616 |
| | | | | 704/257 |

(Continued)

FOREIGN PATENT DOCUMENTS

WO   WO 2008/144638 A2   11/2008

OTHER PUBLICATIONS

Roark, Brian, et al. "Discriminative language modeling with conditional random fields and the perceptron algorithm." Proceedings of the 42nd Annual Meeting on Association for Computational Linguistics. Association for Computational Linguistics, 2004.*

(Continued)

*Primary Examiner* — Jialong He
(74) *Attorney, Agent, or Firm* — Daly, Crowley, Mofford & Durkee, LLP (57) ABSTRACT

Methods and apparatus for speech recognition on user dictated words to generate a dictation and using a discriminative statistical model derived from a deterministic formatting grammar module and user formatted documents to extract features and estimate scores from the formatting graph. The processed dictation can be output as formatted text based on a formatting selection to provide an integrated stochastic and deterministic formatting of the dictation.

18 Claims, 5 Drawing Sheets

(51) Int. Cl.
*G10L 15/18* (2013.01)
*G10L 15/19* (2013.01)
*G10L 15/02* (2006.01)
*G10L 15/06* (2013.01)
*G10L 25/87* (2013.01)

(52) U.S. Cl.
CPC ............ *G10L 15/063* (2013.01); *G10L 15/19* (2013.01); *G10L 25/87* (2013.01)

(56) References Cited

U.S. PATENT DOCUMENTS

| | | | | |
|---|---|---|---|---|
| 7,958,443 | B2* | 6/2011 | Rosen | G06F 17/211 715/223 |
| 8,175,248 | B2 | 5/2012 | Agarwal et al. | |
| 9,508,028 | B2* | 11/2016 | Bannister | G06F 17/30448 |
| 2004/0138881 | A1 | 7/2004 | Divay et al. | |
| 2005/0108010 | A1 | 5/2005 | Frankel et al. | |
| 2007/0271086 | A1* | 11/2007 | Peters | G06F 17/211 704/9 |
| 2013/0317817 | A1* | 11/2013 | Ganong, III | G10L 13/00 704/235 |
| 2013/0346079 | A1 | 12/2013 | Miglietta et al. | |

OTHER PUBLICATIONS

Dragon, "Dragon NaturallySpeaking Users manual, Versoin 11.5", [online], 2011.*

Notification of Transmitall of the International Search Report and the Written Opinion of the International Searching Authority, or the Declaration, PCT/US2014/043798 dated Feb. 16, 2015, 5 pages.

Written Opinion of the International Searching Authority, PCT/US2014/043798 dated Feb. 16, 2015, 4 pages.

Shugrina, Maria: "Formatting Time-Aligned ASR Transcripts for Readability"; Google Inc.; Human Language Technologies: The 2010 Annual Conference of the North American Chapter of the ACL, pp. 198-206 (9 pages); Jun. 2010.

International Preliminary Report on Patentability dated Dec. 27, 2016; for PCT Pat. App. No. PCT/US2014/043798; 5 pages.

* cited by examiner

METHODS AND APPARATUS FOR JOINT STOCHASTIC AND DETERMINISTIC DICTATION FORMATTING

CROSS REFERENCE TO RELATED APPLICATIONS

This application is a National Stage application of PCT/US2014/043798 filed on Jun. 24, 2014, and entitled "METHODS AND APPARATUS FOR JOINT STOCHASTIC AND DETERMINISTIC DICTATION FORMATTING", which is incorporated herein by reference.

BACKGROUND

As is known in the art, voice dictation can contain various ambiguous components. For example, a voice dictation for a number sequence can have a variety of contexts. A user may say "two four eighty four" for a date-of-birth, a number, a string of digits, etc. Similar ambiguities can occur for numbers, addresses, currencies, measurements and other number, alpha, and alpha-numeric items.

SUMMARY

Embodiments of the invention provide formatting of voice dictation that addresses the disambiguation of alternative formatting entities with a joint deterministic-stochastic configuration. During formatting of voice dictation, the verbatim transcription of the user dictation is processed so that dictated entities, such as: numbers, dates, currencies, addresses, etc., are rendered with the formatting style usually expected in a written document. For example, if a user says "twenty six dollars each" the expectation is to obtain a formatted text such as "$26 each." Similarly, "www_dot Nuance dot_com" is expected to be formatted as "www.nuance.com" and "fifty kilometers" as "50 km"; etc.

Embodiments of the invention combine a deterministic approach, which can be based on manually engineered formatting rules and grammars, with a stochastic model, e.g., estimating statistics from formatted text documents. In general, the deterministic component is used to identify the formatting entities that should be supported by the formatter (e.g., numbers, dates, currencies, measurements, addresses) and to specify formatting style. One example for date formatting could be MM/DD/YY. A stochastic component learns how to interpret ambiguous readings of the dictation and how to choose the most appropriate formatting entity according to its context. Note that the interpretation of the voice dictation, required to adequately format it, may present ambiguities. For example: the voice dictation "twelve twenty one thirteen" can represent different entities in different contexts: a date "12/21/13," a digit sequence "122113," a list of two cardinal numbers "1221 13," etc. If the user dictates "born on twelve twenty one thirteen" the stochastic model can leverage the context "born on" and choose the rendering of "twelve twenty one thirteen" as a date: "born on 12/21/13."

Embodiments of the invention address the formatting of automatically transcribed user dictation by focusing on the disambiguation of competing interpretations of the dictated text. In one embodiment, a deterministic grammar-based formatter is integrated with a stochastic approach, which learns from user-formatted examples how to disambiguate competing readings of the text that may otherwise lead to inadequately formatted renderings.

In embodiments, in addition to an integrated stochastic and deterministic formatting approach, handcrafted deterministic formatting grammars are leveraged to train a stochastic modeling component. The hand-written grammars are used for processing the formatted user data, and identifying and concept-labeling formatting examples that are subsequently used to discriminatively train the stochastic model. In other words, the deterministic formatting grammars not only define which formatting entities/concepts are supported and which formatting style will be used to render them, but are also used to automatically select and appropriately label the user formatted data required to train the stochastic model. Therefore, the stochastic model will be in sync with the deterministic grammar rules used to train it. Note that multiple competing formatting alternatives can be generated from each user-formatting by leveraging the formatting grammars.

In embodiments, online learning is provided from pre-existing user revised dictated documents for individually customizing the disambiguation of alternative readings of the dictation. In other words the stochastic model can be adapted to previously dictated documents so that the formatter disambiguation decisions are inferred from past user-specific dictation behaviors. This stochastic model adaptation process may be performed either online within the deployed application or other locations.

In one aspect of the invention, a method comprises: performing, using a computer processor, speech recognition on user dictated words to generate a dictation; parsing the dictation using a deterministic formatting grammar module to build a formatting graph; using a discriminative statistical model derived from a deterministic formatting grammar module and user formatted documents to extract features from the formatting graph and to estimate scores; choosing a path in the formatting graph as a formatting selection; and outputting the dictation as formatted text based on the formatting selection to provide an integrated stochastic and deterministic formatting of the dictation for disambiguation of the user dictated words.

The method can further include one or more of the following features: automatically transcribing the user dictated words, detecting pause durations in the user dictated words using a speech-to-text recognition engine, choosing a path in the formatting graph as the formatting selection by analyzing scores derived from the discriminative statistical model and the extracted features, the user dictated words include numbers, the user dictated words include a website address, the user dictated words include dates, addresses, birthdates, email addresses, and measurements, training the discriminative statistical model from the deterministic formatting grammar module by segmenting user formatted documents into formatted sentences, converting the formatted sentences into simulated dictation, building a concept tagged graph from the simulated dictation, extracting formatting alternatives and performing distance measurements, performing feature extraction, training a statistical discriminative model and/or customizing the disambiguation for a particular user.

In another aspect of the invention, a method comprises: training, using a computer processor, a discriminative statistical model from a deterministic formatting grammar module and user formatted documents to perform speech recognition on user dictated words to generate a dictation as formatted text for providing an integrated stochastic and deterministic formatting of the dictation for disambiguation of user dictated words.

The method can further include one or more of the following features: segmenting the user formatted documents into formatted sentences; converting the formatted sentences into simulated dictation; building a concept tagged formatting graph from the simulated dictation; extracting formatting alternatives and performing a distance measurement on the formatting alternatives; and/or, performing feature extraction and training a statistical model.

In another aspect of the invention, an article comprises: a non-transitory computer-readable medium having stored instructions that enable a machine to: perform speech recognition on user dictated words to generate a dictation; parse the dictation using a deterministic formatting grammar module to build a formatting graph; use a discriminative statistical model derived from a deterministic formatting grammar module and user formatted documents to extract features from the formatting graph and estimate scores; analyze the scores to choose a path in the formatting graph as a formatting selection; and output the dictation as formatted text based on the formatting selection to provide an integrated stochastic and deterministic formatting of the dictation for disambiguation of the user dictated words.

The article can further include one or more of the following features: instructions to: detect pause durations in the user dictated words using a speech-to-text recognition engine; and, choose a path in a formatting graph as the formatting selection by analyzing scores derived from the application of a discriminative statistical model based on features extracted from the user dictation and pause durations, the user dictated words include dates, addresses, birthdates, email addresses, times, currencies, alphanumeric sequences, abbreviations and measurements; instructions to train the discriminative statistical model from the deterministic formatting grammar module and the user formatted documents to perform disambiguation and formatting on the user dictated words; and/or instructions to: segment the user formatted documents into formatted sentences; convert the formatted sentences into simulated dictation; build a concept tagged formatting graph from the simulated dictation; extract formatting alternatives and performing a distance measurement; perform feature extraction and train a statistical model.

BRIEF DESCRIPTION OF THE DRAWINGS

The foregoing features of this invention, as well as the invention itself, may be more fully understood from the following description of the drawings in which.

DETAILED DESCRIPTION

Embodiments of the invention integrate deterministic and stochastic processing to enhance text formatting. Preserving coded grammar knowledge and integrating this knowledge with statistical observations from real-world user formatted data, provides improvement to the deterministic grammar flexibility, while still preserving its knowledge and customizability. It is readily understood to one of ordinary skill in the art that manually designing deterministic formatting rules to disambiguate alternative readings of the voice dictation can be expensive and time consuming.

Embodiments of the invention utilize, in addition to the deterministic information, a stochastic model automatically trained on user formatted data to simplify the grammars and improve the number of alternative readings that are successfully disambiguated. This approach leverages the hand-crafted formatting rules to automatically select and process the user-formatted data required to train the stochastic model.

The underlying deterministic approach allows defining which formatting entities should be supported by the formatter and controls the formatting style used to render them. The choice among different formatting styles for dates, currencies, numbers, addresses, measurements, abbreviations, and telephone numbers can be left to end user customization and advertised as a product feature.

Figure 1:
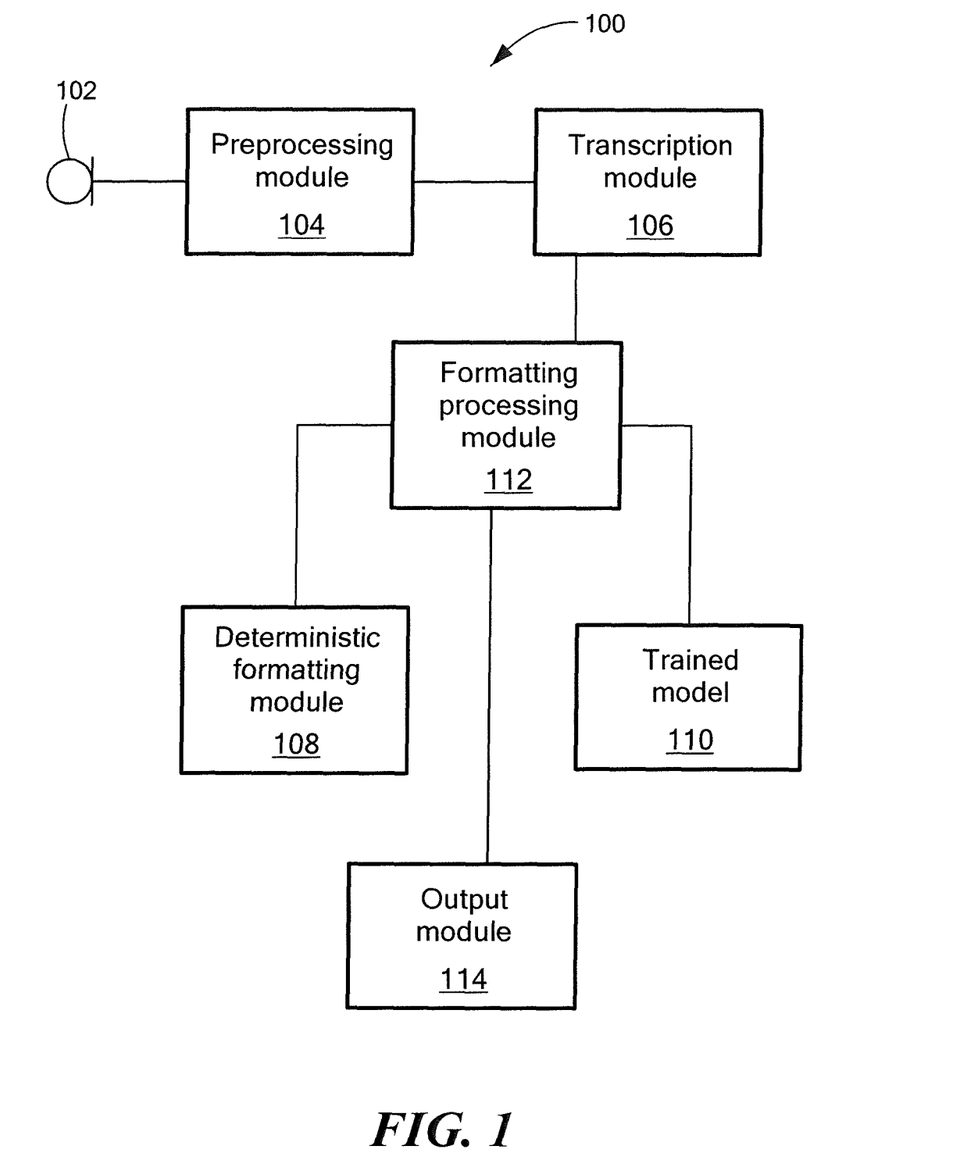
FIG. 1 is a schematic representation of a system having integrated deterministic and stochastic processing of dictation.

FIG. 1 shows a system 100 having voice dictation formatting in accordance with embodiments of the invention. A microphone 102 is coupled to a pre-processing module 104 that can provide speech enhancement and denoising along with voice activity detection and acoustic feature extraction. The pre-processed output from module 104 is provided to a transcription module 106 that transcribes the speech received from the user by the microphone 102. The verbatim speech transcription generated by the transcription module 106 is transformed by a formatting processing module 112 into text formatted with the formatting style usually expected in a written document. A deterministic formatting module 108 and a trained stochastic model 110 are coupled to a formatting processing module 112, which is coupled to an output module 114. As described more fully below, deterministic and stochastic processing are integrated via the deterministic formatting module 108 and the trained model 110 to disambiguate competing readings of the verbatim speech transcription 106 and hence to provide formatted text 114.

Figure 2:
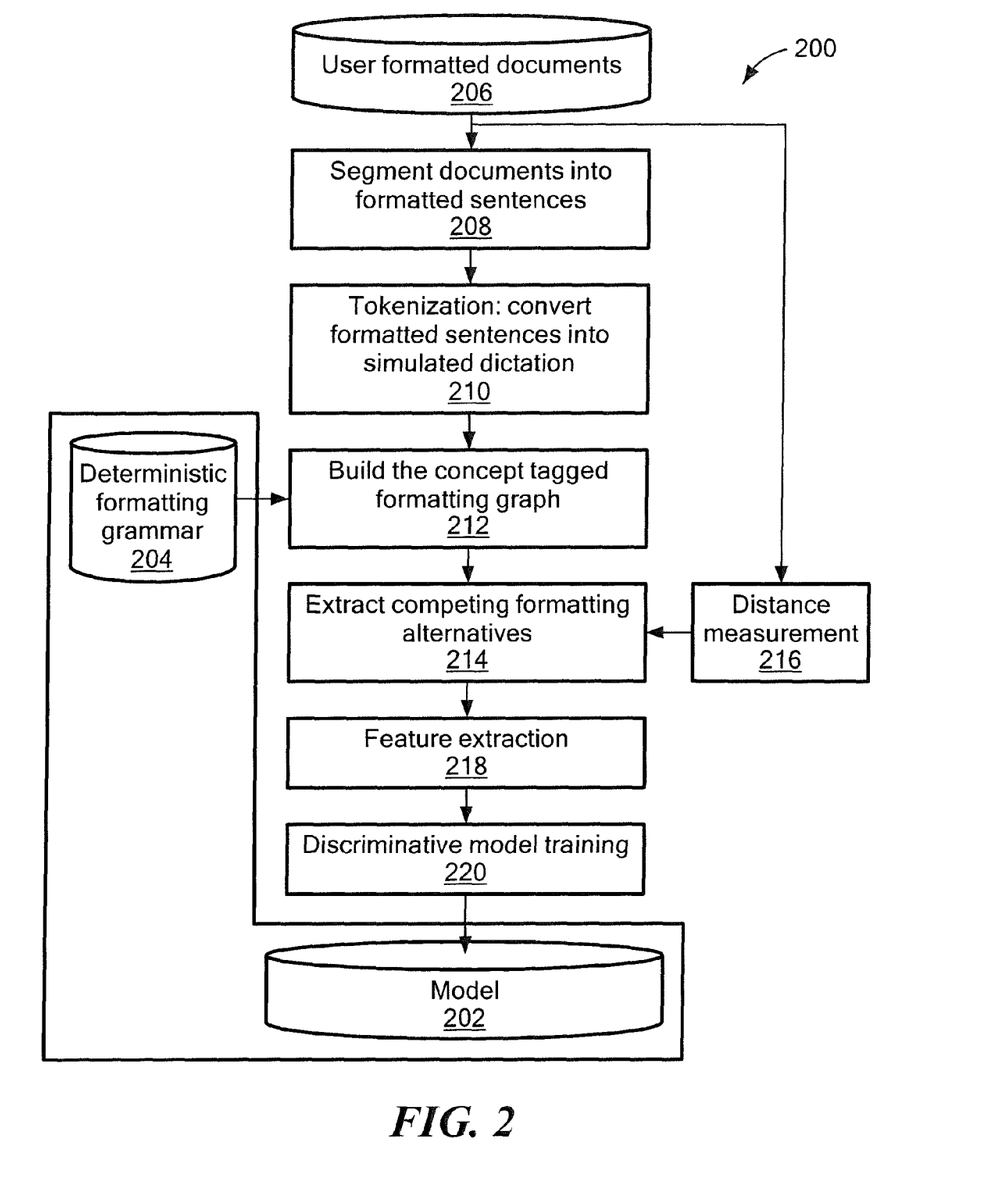
FIG. 2 is a flow diagram showing an illustrative sequence of steps for generating a trained stochastic model.

FIG. 2 shows an exemplary sequence of steps 200 for training a model 202 based upon a deterministic formatting grammar module 204. The model 202, once trained, can be used to format user dictation, as described more fully below in conjunction with FIG. 3.

The deterministic formatting grammar module 204 is formed from grammar development in a manner well known in the art. For example, a deterministic formatting grammar module can be developed by manually compiling deterministic formatting grammar including a set of formatting rules required to support desired formatting entities/concepts, such as: dates, times, currencies, addresses, cardinal numbers, telephone numbers, measurements, etc. Note that the formatting grammar has already been iteratively developed, such as over the course of years. It is understood that any suitable deterministic formatting module can be used.

In step 206, a collection of user formatted textual documents or any other text document whose formatting is representative of the formatting entities/concepts and rendering styles covered by the grammar module 204, can be compiled. Illustrative documents include books, articles, manuscripts, web-collected data, previously dictated documents, etc. Note that the user dictation may not be available for some/all of the collected documents; a "simulated" dictation can be generated whenever the real user dictation is unavailable. The user formatted documents are then prepared in a series of steps prior to discriminative model training. In step 208, the formatted documents are segmented into punctuation delimited formatted sentences and processed one-by-one. In step 210, each formatted sentence lacking the real spoken dictation is converted into simulated user dictation via "tokenization." Tokenization is the opposite task of text formatting—tokenization aims at converting written text into spoken dictation. For example "$10 each" is tokenized as "ten dollars each." Tokenization is performed using a deterministic approach based on already developed tokenization grammars.

In step 212, alternative formattings for the utterances from steps 208 and 210 are generated by applying the deterministic formatting grammar module 204, such as by creating a concept-tagged formatting graph where each deterministic formatting grammar parse added to the graph is tagged according to the parsed formatting concept: date, currency, cardinal number, address, measurement, telephone number, etc. In step 214, competing formatting alternatives from the concept tagged formatting graph of step 212 are extracted and their distance 216 to the reference formatted sentence is measured. In one embodiment, a modified version of the Levenshtein edit-distance [V. I. Levenshtein, "Binary Codes Capable of Correcting Deletions, Insertions, and Reversals", in Soviet Physics Doklady 1966, 10 (8), pp. 707-710] tolerant with respect to capitalization and white space differences is used as distance measure. It is understood that any suitable distance measure can be used. It is further understood that a suitable distance measure should identify at least one formatting alternative that matches the input reference formatted sentence from step 208. Otherwise the input sentence is discarded from the training set and feature extraction below is skipped. In step 218, a set of features from each alternative formatting is extracted, for example, n-grams of concept tagged tokens, number of grammar parsed/unparsed tokens, pause durations, etc. It is understood that any suitable feature set can be used.

In step 220, a discriminative statistical model is trained on the extracted features of step 218 aiming at minimizing the expected character error rate, e.g., the modified Levenshtein edit-distance 216. In one embodiment, training of the model is based on Perceptron (see, e.g., Y. Freund and R. Schapire, "Large Margin Classification using the Perceptron Algorithm", in Machine Learning 1999, 3(37), pp. 277-296) feature selection and initialization followed by Conditional Random Field (see, e.g., J. Lafferty, A. McCallum, and F. Pereira, "Conditional Random Fields: Probabilistic Models for Segmenting and Labeling Sequence Data", in Proc. International Conference on Machine Learning 2001, pp. 282-289) training procedure extensively described, for example, in B. Roark, M. Saraclar, M. Collins, and M. Johnson, "Discriminative Language Modeling with Conditional Random Fields and the Perceptron Algorithm", in Proc. Association for Computational Linguistics 2004, Article No. 47, pp. 47-54. The discriminative statistical model training in step 220 faithfully follows the training procedure described in Roark et al. 2004, for example. It is understood that any suitable model training approach can be used. The formatting grammar module 204 and the trained discriminative model 202 are then packaged together for use in processing user dictation, as described below. It is understood that all references cited herein are incorporated by reference into this document.

Figure 3:
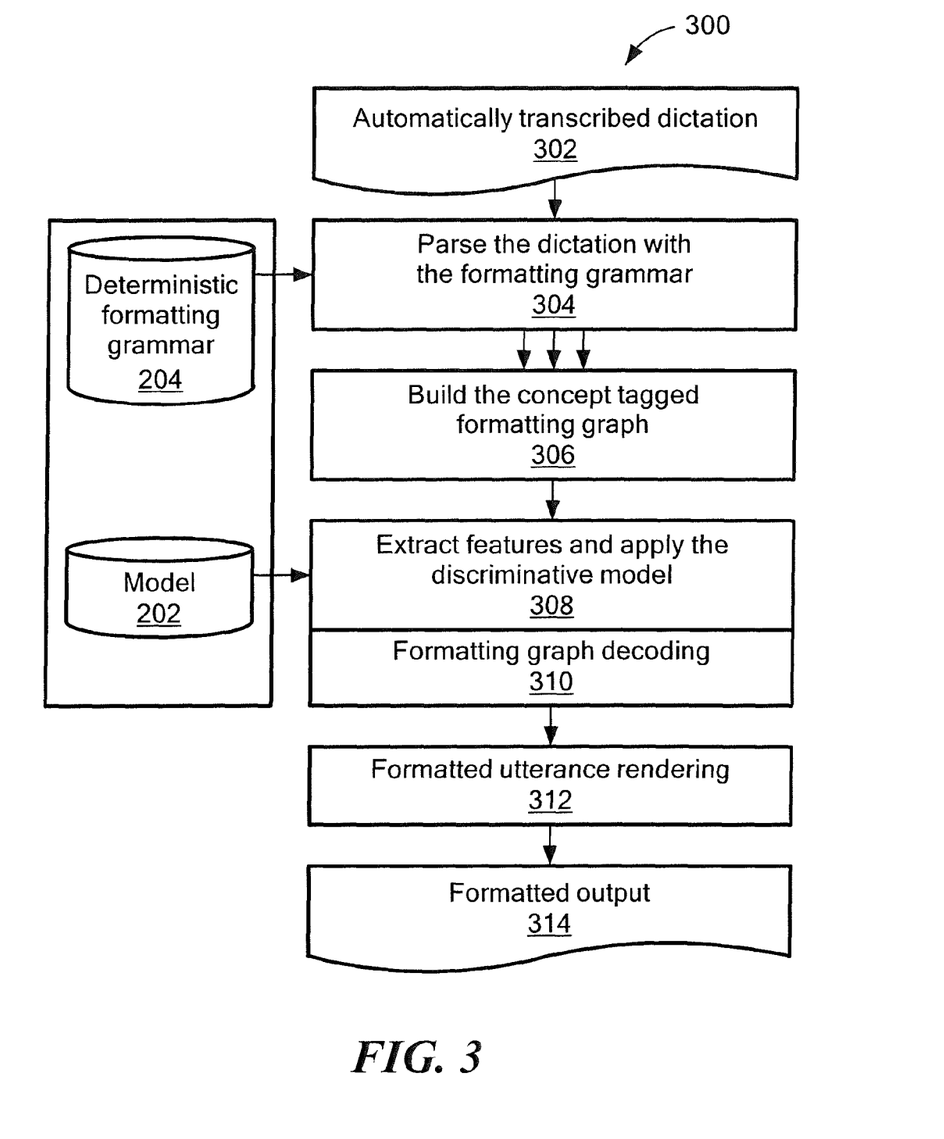
FIG. 3 is a flow diagram showing an illustrative sequence of steps for processing user dictation.

FIG. 3 shows an exemplary sequence of steps 300 for processing user dictation in accordance with illustrative embodiments of the invention. In step 302, a sequence of user dictated words/tokens is received along with pause durations between the words as recognized by a speech-to-text recognition engine, such as the Nuance Modular RECognizer used within Dragon NaturallySpeaking of Nuance Communications, Inc., of Burlington Mass. It is understood that other suitable speech recognition engine/decoders can be used. Note that "tokens" is the technical term traditionally used in the literature to refer to the "words" automatically recognized by a speech-to-text recognition engine.

In step 304, a formatting grammar module, such as the formatting grammar module 204 of FIG. 2, is applied to the sequence of dictated words/tokens 302. In step 306, a concept tagged formatting graph is built that includes the grammar parses and the sequence of dictated words\tokens 302. In step 308, for each path in the formatting graph, the same set of features used in step 218 (FIG. 2) during discriminative model training is extracted and their associated scores found in the discriminative model 202 (FIG. 2) are accumulated. Each node in the formatting graph 306 corresponds to one or more tokens from the sequence of dictated tokens 302 and is either associated to the formatting concept resulting from the application/parsing of the formatting grammar module (FIG. 2) 204 (e.g., dates, addresses, cardinal numbers, currencies, etc.) or constitutes an "unparsed token", here tagged as "token" concept. Features such as the token sequences (i.e., n-grams) with their associated formatting entities/concepts are extracted from the formatting graph. It is understood that any suitable feature set matching the set employed in step 218 (FIG. 2) during discriminative model training can be used.

In step 310, the best scoring path corresponding to the maximum likelihood formatting alternative according to the discriminative model 202 is chosen as the optimal formatting alternative/decision.

Features such as the concept labelled token n-gram sequences extracted from the formatting graph in step 308 are used to query their associated scores contained in the discriminative model 202 (FIG. 2). It is readily understood that the discriminatively trained statistical model 202 (FIG. 2) includes a table of features with their corresponding scores. The aim of the model training step 220 (FIG. 2) is to estimate the score corresponding to each feature value, this task being performed using the Perceptron and CRF model training procedure of Roark et al. 2004 or any suitable stochastic model training approach. The scores obtained by querying the discriminative model 202 (FIG. 2) are then individually accumulated over each of the formatting paths that can be extracted from the formatting graph. The formatting path resulting in the smallest accumulated score is considered as the optimal formatting alternative/decision.

In step 312, final formatting rendering steps are applied to the formatting choice of step 310. For example, the following formatting actions can be performed: apply customizable word rewrites, adjust capitalization and spacing according to specific user commands, etc. In step 314, the formatted output can be delivered in a desired manner.

Figure 3A:
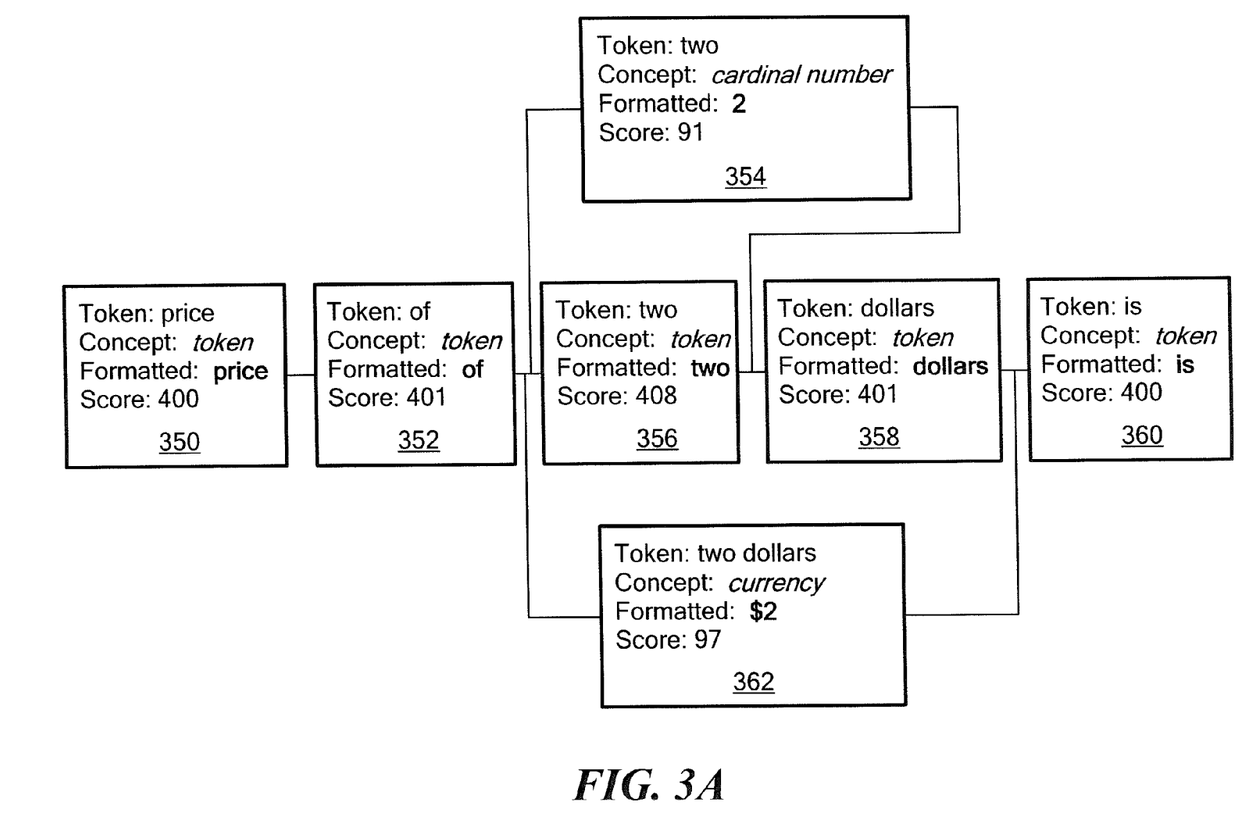
FIG. 3A is a schematic representation of features extracted from a formatting graph and formatting alternatives.

FIG. 3A shows illustrative processing for a sequence of dictated words: "price of two dollars is" for which a concept tagged formatting graph is generated from a formatting grammar module. Concept labelled token n-gram features include:
{(Token: price, Concept: token)}
{(Token: price, Concept: token), (Token: of, Concept: token)}
{(Token: price, Concept: token), (Token: of, Concept: token), (Token: two, Concept: token)}

{(Token: price, Concept: token), (Token: of, Concept: token), (Token: two, Concept: cardinal number)} etc.

These features are extracted from the formatting graph with associated scores obtained from the discriminative model 202 (FIG. 2).

In the illustrative embodiment, a first component 350 corresponds to {(Token: price, Concept: token)} formatted as "price" with a score of 400. A second component 352 corresponds to {(Token: of, Concept: token)} formatted as "of" with a score of 401. {(Token: two, Concept: cardinal number)} 354 is formatted as "2" with a score of 91. {(Token: two, Concept: token)} 356 is formatted as "two" with a score of 408. {(Token: dollars, Concept: token)} 358 is formatted as "dollars" with a score of 401. {(Token: is, Concept: token)} 360 is formatted as "is" with a score of 400. {(Tokens: two dollars, Concept: currency)} 362 is formatted as "$2" with a score of 97.

From this graph, formatting alternatives include:
"price of 2 dollars is"→total score: 1693
"price of two dollars is"→total score: 2010
"price of $2 is"→total score: 1298

The formatting alternative corresponding to the best scoring path, here the lowest total score, is "price of $2 is" at the lowest score of 1298.

The feature set used in step 218 (FIG. 2) to train the discriminative model 202, and used to disambiguate multiple formatting alternatives in steps 308 and 310 (FIG. 3), is not limited to the n-grams of concept labeled tokens shown and described above. This feature set may also include the number of grammar parsed/unparsed tokens, pause durations, and/or any other suitable feature.

While embodiments of the invention are shown and described in conjunction with numerical ambiguities, it is understood that embodiments are applicable to any dictation ambiguity, such as addresses, currencies, measurements, email addresses, and other numerical, alphabetical, and alpha-numeric items.

Illustrative embodiments are shown and described above in which a deterministic formatting grammar module constitutes a resource during formatting and preparing the user formatted data for stochastic model training. In one embodiment, the formatting grammar is used, along with a tokenizer and its associated grammar, to automatically select the user formatted training sentences, and to label them in terms of formatting entities/concepts (e.g. dates, addresses, cardinal numbers, etc.).

In contrast, some conventional systems employ an additional grammar, or a modified tokenizer grammar, to label the training data in terms of "number classes," for example. In addition, some conventional systems are limited to addressing only numeric formatting.

Figure 4:
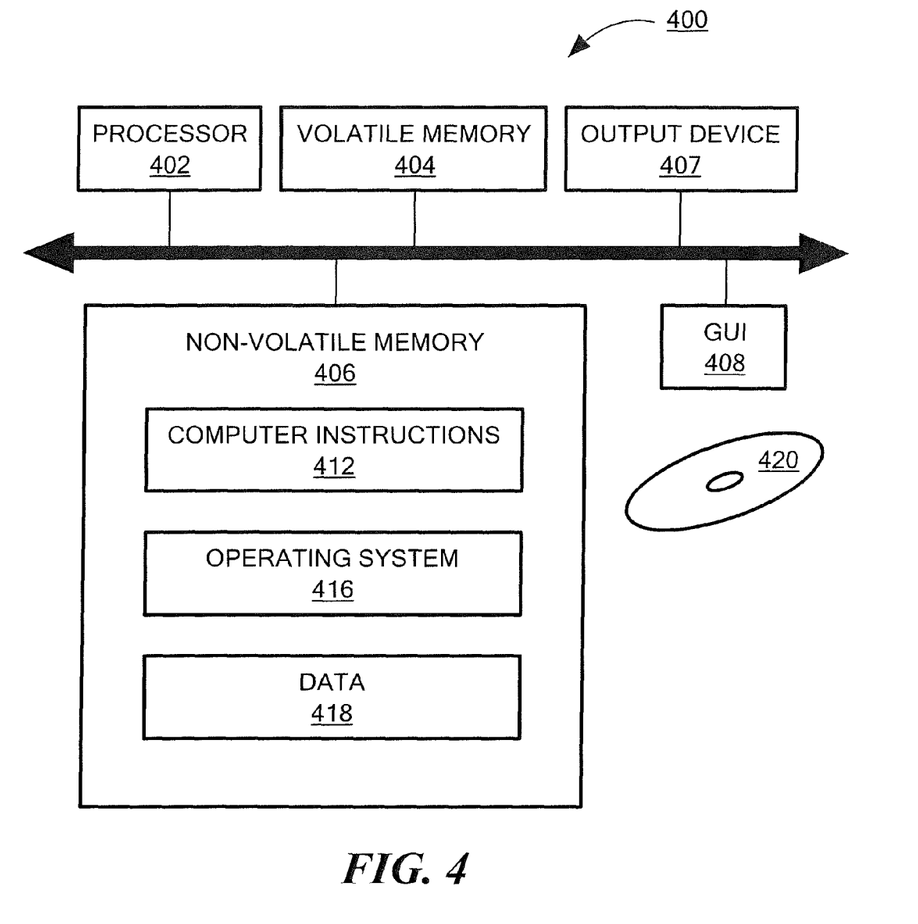
FIG. 4 is a schematic representation of an illustrative computer that can perform at least a portion of the processing described herein.

FIG. 4 shows an exemplary computer 400 that can perform at least part of the processing described herein. The computer 400 includes a processor 402, a volatile memory 404, a non-volatile memory 406 (e.g., hard disk), an output device 407 and a graphical user interface (GUI) 408 (e.g., a mouse, a keyboard, a display, for example). The non-volatile memory 406 stores computer instructions 412, an operating system 416 and data 418. In one example, the computer instructions 412 are executed by the processor 402 out of volatile memory 404. In one embodiment, an article 420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

The invention claimed is:

1. A method, comprising:
performing, using a computer processor, speech recognition on user dictated words to generate a dictation;
parsing the dictation using a deterministic formatting grammar module to build a concept-tagged formatting graph;
extracting features from the formatting graph;
estimating scores for the extracted features using a discriminative statistical model, wherein the discriminative statistical model is derived from a deterministic formatting grammar module and user formatted documents;
choosing a path in the formatting graph as a formatting selection based on the estimated scores; and
outputting the dictation as formatted text based on the formatting selection to provide an integrated stochastic and deterministic formatting of the dictation for disambiguation of the user dictated words.

2. The method according to claim 1, further including automatically transcribing the user dictated words.

3. The method according to claim 1, further including detecting pause durations in the user dictated words using a speech-to-text recognition engine.

4. The method according to claim 1, further including choosing a path in the formatting graph as the formatting selection by analyzing scores derived from the discriminative statistical model and the extracted features.

5. The method according to claim 1, wherein the user dictated words include numbers.

6. The method according to claim 1, wherein the user dictated words include a website address.

7. The method according to claim 1, wherein user dictated words include dates, times, addresses, birthdates, currencies, fractions, equations, alphanumeric sequences, abbreviations, telephone numbers, postal codes, email addresses, and measurements.

8. The method according to claim 1, further including training the discriminative statistical model from the deterministic formatting grammar module by segmenting formatted documents into formatted sentences.

9. The method according to claim 8, further including converting the formatted sentences into simulated dictation.

10. The method according to claim 9, further including building the concept tagged formatting graph from the simulated dictation.

11. The method according to claim 10, further including extracting formatting alternative and performing a distance measurement.

12. The method according to claim 11, further including performing feature extraction and statistical model training.

13. The method according to claim 8, further including customizing the disambiguation for a particular user.

14. An article, comprising:
a non-transitory computer-readable medium having stored instructions that enable a machine to:
perform speech recognition on user dictated words to generate a dictation;
parse the dictation using a deterministic formatting grammar module to build a concept-tagged formatting graph;
extract features from the formatting graph;
estimate scores for the extracted features using a discriminative statistical model, wherein the discriminative statistical model is derived from a deterministic formatting grammar module and user formatted documents;
choose a path in the formatting graph as a formatting selection based on the estimated scores; and
output the dictation as formatted text based on the formatting selection to provide an integrated stochastic and deterministic formatting of the dictation for disambiguation of the user dictated words.

15. The article according to claim 14, further including instructions to:
detect pause durations in the user dictated words using a speech-to-text recognition engine; and
choose a path in a formatting graph as the formatting selection by analyzing scores derived from a discriminative statistical model and features extracted from the user dictation.

16. The article according to claim 14, wherein user dictated words include dates, times, addresses, birthdates, currencies, fractions, equations, alphanumeric sequences, abbreviations, telephone numbers, postal codes, email addresses, and measurements.

17. The article according to claim 14, further including stored instructions to train the discriminative statistical model from the deterministic formatting grammar module and the user formatted documents to perform disambiguation on the user dictated words.

18. The article according to claim 17, further including instructions to:
segment the user formatted documents into formatted sentences;
convert the formatted sentences into simulated dictation;
build a concept tagged formatting graph from the simulated dictation;
extract formatting alternative and performing a distance measurement; and
perform feature extraction and statistical model training.

* * * * *